US007705488B2

(12) United States Patent
Clemo et al.

(10) Patent No.: US 7,705,488 B2
(45) Date of Patent: Apr. 27, 2010

(54) APPARATUS, SYSTEM, AND METHOD FOR A HIGH VOLTAGE, HIGH FREQUENCY REDUNDANT BUS POWER SYSTEM

(75) Inventors: Raymond M. Clemo, Raleigh, NC (US);
Cecil C. Dishman, Raleigh, NC (US);
Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 11/966,496

(22) Filed: Dec. 28, 2007

(65) Prior Publication Data

US 2009/0167087 A1    Jul. 2, 2009

(51) Int. Cl.
*H02J 9/00* (2006.01)

(52) U.S. Cl. ........................................................ 307/64

(58) Field of Classification Search .................... 307/43, 307/45, 64
See application file for complete search history.

(56) References Cited

U.S. PATENT DOCUMENTS

| | | | |
|---|---|---|---|
| 5,500,791 | A | 3/1996 | Kheraluwala et al. |
| 5,994,793 | A * | 11/1999 | Bobry ........................ 307/64 |
| 7,038,433 | B2 | 5/2006 | Fan et al. |
| 7,151,678 | B2 | 12/2006 | Booth |
| 7,187,563 | B1 * | 3/2007 | Bobrek .................... 363/21.01 |
| 7,310,250 | B2 * | 12/2007 | Lee ............................. 363/52 |
| 7,471,014 | B2 * | 12/2008 | Lum et al. .................... 307/83 |

OTHER PUBLICATIONS

"MTL8000 1/1 Series-Overview", http://www.mtlkk.com/english/images/prosess/mtl8000_1/pdf/overview.pdf, 2 pages, Nov. 2002.
"Distributed Power System Using AC to Solve DC Distributed Power Problems", http://www.dlnet.vt.edu/repository/previewRepository/EE000000/EE008000/EE008004/DISK1/DLNET-02-03-2003-0195/resources%5Ctpacdpw1.doc, May 1995.

* cited by examiner

*Primary Examiner*—Albert W Paladini
*Assistant Examiner*—Michael Rutland Wallis
(74) *Attorney, Agent, or Firm*—Kunzler Needham Massey & Thorpe

(57) ABSTRACT

An apparatus, system, and method are disclosed for redundant power supplies. A regulator module receives a first power waveform from a first power supply module and a second power waveform from a second power supply module and provides power to a low voltage, regulated output bus. The power waveforms include high voltage, high frequency, chopped power waveforms. The regulator module includes an interleaved power supply stage that receives the power waveforms as pulse-width modulated power signals and converts the first and second power waveforms to the low voltage, regulated voltage on the output bus. The regulator module includes a feedback module that receives a voltage feedback signal from the output bus, adjusts a duty cycle based on the feedback signal, and transmits a drive signal based on the duty cycle to the power supply modules which use the drive signals to generate the first and second power waveforms.

19 Claims, 5 Drawing Sheets

APPARATUS, SYSTEM, AND METHOD FOR A HIGH VOLTAGE, HIGH FREQUENCY REDUNDANT BUS POWER SYSTEM

BACKGROUND OF THE INVENTION

1. Field of the Invention

This invention relates to power supplies and more particularly relates to a high voltage, high frequency redundant bus for connecting redundant power supplies.

2. Description of the Related Art

Many computer systems store data that is critical and must be highly available. To increase data availability, redundant data storage, redundant computers, redundant data paths, redundant communication paths, etc. are used. One critical aspect of increasing reliability and data availability is for computer systems to be powered from redundant power supplies connected to multiple sources.

The system 100 depicted in FIG. 1 is a typical way of connecting redundant power supplies 102, 104 to a computer system, such as a blade center. Power supply 1 102 receives power from a first power source 106 and power supply 2 104 receives power from a second power source 108. The power supplies 102, 104 are connected through a backplane 110 to an output bus 112. Typically the output bus 112 connects to servers, storage devices, etc. The backplane 110 typically facilitates easy connection of servers, storage devices, and other components in a blade center. A blade center can support many devices so the power supplies 102, 104 are relatively large. The backplane 110 connects to the first power supply 102 through connector J1 114, to the second power supply 104 through connector J2 116, and to other devices through connector J3 118.

A typical blade center power supply 102, 104 may be rated at 1200 W, but may be rated higher or lower. Often the output bus 112 is regulated to a low voltage, such as 12 volts ("V"), but may be regulated to other voltages. For example, in a power supply 102, 104, voltages of +24 v, +20 v, +12 v, +6 v, +5 v, +3.3 v, and −12 v are commonly provided. The power supplies 102, 104 may also have multiple output stages to provide more than one output voltage.

At an output voltage of 12 V, a power supply 102, 104 rated at 1200 watts ("W") could supply 100 amperes ("A"). If the supplied voltage is lower, the rated amperage would be even higher. At 100 A, the buses or wires in the backplane 110 and output of the power supplies 102, 104 must be large. Connectors 114, 116, 118 rated for 100 A are large, complex, and expensive. The cost of the connectors 114, 116, 118 and wiring can drive up the cost of the computer system 100 and can increase complexity.

SUMMARY OF THE INVENTION

From the foregoing discussion, it should be apparent that a need exists for an apparatus, system, and method for a high voltage, high frequency redundant bus power system. Beneficially, such an apparatus, system, and method would have high voltage, high frequency connections for power supply modules that are smaller and less costly than low voltage, high amperage connectors. The apparatus, system, and method would retain a high reliability.

The present invention has been developed in response to the present state of the art, and in particular, in response to the problems and needs in the art that have not yet been fully solved by currently available power supplies. Accordingly, the present invention has been developed to provide an apparatus, system, and method for redundant power supplies that overcome many or all of the above-discussed shortcomings in the art.

The apparatus for redundant power supplies is provided with a plurality of modules and stages. These modules and stages in the described embodiments include a regulator module that receives a first power waveform from a first power supply module and receives a second power waveform from a second power supply module and provides power to a low voltage, regulated output bus. The first and second power waveforms include high voltage, high frequency, chopped power waveforms. The regulator module includes an interleaved power supply stage that receives the first and second power waveforms as pulse-width modulated power signals and converts the first and second power waveforms to the low voltage, regulated voltage on the output bus. The regulator module includes a feedback module that receives a voltage feedback signal from the output bus, adjusts a duty cycle based on the feedback signal, and transmits a drive signal based on the duty cycle to each of the first and second power supply modules. The first and second power supply modules use the drive signals to generate the first and second power waveforms.

In one embodiment, the apparatus includes comprising a first high voltage connector and a second high voltage connector. The first power waveform is received from the first power supply module through the first high voltage connector and the second power waveform received from the second power supply module through the second high voltage connector. In another embodiment, the first power supply module can be connected and disconnected at the first high voltage disconnect while the regulator module is operational and the second power supply module can be connected and disconnected at the second high voltage disconnect while the regulator module is operational.

In one embodiment, the first and second power supply modules each include one or more switching elements that connect and disconnect a high voltage source to the regulator module. In the embodiment, each switching element receives a drive signal from the feedback module and closes and opens the switching element to adjust a duty cycle of the first and second power waveforms consistent with the duty cycle generated by the feedback module. In another embodiment, the first power supply module receives power from a first power source and the second power supply module receives power from a second power source. In another embodiment, the first and second power supply modules each include at least one of a rectifier stage to rectify alternating current ("AC") power, an electromagnetic compatibility ("EMC") filter, and an active power factor correction stage.

In another embodiment, the high voltage source of the first power supply module includes an internal bus regulated by the first power supply module and the high voltage source of the second power supply module comprises an internal bus regulated by the second power supply module. In another embodiment, the high voltage source of each of the first and second power supply modules is regulated to voltage within a voltage range of about 200 volts to 600 volts and the output bus is regulated to a voltage in an output voltage range of about three volts to about 24 volts and the low voltage, high current connector is rated to a current in a current range of about 50 amperes to about 400 amperes.

In one embodiment, the apparatus includes a low voltage, high current connector that connects the regulated output bus to a load. In another embodiment, the interleaved power supply includes one or more step-down transformers, one or more power diodes, one or more inductors, and at least one capacitor. The transformers, diodes, inductors, and capacitors are arranged in a power supply topology to receive the first and second power supply waveforms and to provide the regulated voltage to the output bus.

In another embodiment, the apparatus includes two or more drive transformers, where each drive transformer receives a drive signal from the feedback module and conditions the drive signal to an appropriate level to connect to one or more switching elements in the first and second power supply modules. In another embodiment, one or more drive signals to the first power supply module are arranged with respect to one or more drive signals to the second power supply module such that the first power waveform is out of phase with the second power waveform.

Another apparatus is provided for redundant power supplies. The apparatus includes a first power supply module that receives power from a first power source and one or more first drive signals from a regulator module and provides a first power waveform to the regulator module. The first power waveform includes a high voltage, high frequency, chopped power waveform. The first power supply module includes a high voltage regulator stage that receives input power from the first power source and generates a high voltage on an internal bus. The first power supply includes one or more switching elements that connect and disconnect the internal bus to the regulator module to generate the first power waveform. Each switching element receives a drive signal from the regulator module and closes and opens the switching element to adjust a duty cycle of the first power waveform consistent with a duty cycle generated by the regulator module;

The regulator module receives the first power waveform from the first power supply module and a second power waveform a second power supply module and provides power to a low voltage, regulated output bus. The power provided to the low voltage bus is converted from the first and second power waveforms. The regulator module transmits the one or more first drive signals to the first power supply module and one or more second drive signals to the second power supply module. The first and second drive signals are related to a duty cycle generated to regulate the output bus.

Another apparatus is also provided for redundant power supplies. The apparatus includes a first transformer that is a step-down transformer where a primary winding of the first transformer includes a connection to a first power supply module through a connector and the first power supply module supplies a high voltage, high frequency, chopped power waveform to the first transformer. The apparatus includes a second transformer that is a step-down transformer where a primary winding of the second transformer includes a connection to a second power supply module through a connector and the second power supply module supplies a high voltage, high frequency, chopped power waveform to the second transformer.

The apparatus includes a first diode where a positive terminal of a secondary winding of the first transformer includes a connection to an anode side of the first diode. The apparatus includes a second diode where a positive terminal of a secondary winding of the second transformer includes a connection to an anode side of the first diode. The apparatus includes an inductor with a first connection connected to a cathode side of the first diode and to a cathode side of the second diode. The apparatus includes an output bus where a positive terminal of the output bus includes a connection to a second connection of the inductor and a negative terminal of the output bus includes a connection to a negative terminal of the secondary winding of the first transformer and to a negative terminal of the secondary winding of the second transformer. The output bus provides a regulated direct current ("DC") voltage to a load.

In one embodiment, the apparatus includes a capacitor connected between the positive and negative terminals of the output bus. In another embodiment, the apparatus includes a free-wheeling diode where an anode of the free-wheeling diode includes a connection to the negative terminal of the output bus and a cathode of the free-wheeling diode includes a connection to the first connection of the inductor.

A system of the present invention is also presented for redundant power supplies. The system may be embodied by a first power supply module, a second power supply module, and a regulator module. The first power supply module receives power from a first power source and the second power supply module receives power from a second power source. The regulator module receives at least a first power waveform from the first power supply module and a second power waveform from the second power supply module and provides power to a low voltage, regulated output bus. The first and second power waveforms include high voltage, high frequency, chopped power waveforms.

The regulator module includes an interleaved power supply stage that receives the first and second power waveforms as pulse-width modulated power signals and converts the first and second power waveforms to the low voltage, regulated voltage on the output bus. The regulator module includes a feedback module that receives a voltage feedback signal from the output bus, adjusts a duty cycle based on the feedback signal, and transmits a drive signal based on the duty cycle to each of the first and second power supply modules. The first and second power supply modules use the drive signals to generate the first and second power waveforms.

The system may further include one or more power supply modules in addition to the first and second power supply modules. The additional power supplies each provide high voltage, high frequency, chopped waveform to the regulator stage and each additional power supply is connected to the first power source, the second power source, or an additional power source. In another embodiment, the first power supply module, the second power supply module, and the regulator module are elements in a blade center and the output bus is a bus in the blade center that provides power to blades of the blade center. The first and second power supply modules provide redundant power to the blade center and are connected to the regulator module through one or more high voltage, high frequency connectors.

A method of the present invention is also presented for redundant power supplies. The method in the disclosed embodiments substantially includes the steps necessary to carry out the functions presented above with respect to the operation of the described apparatus and system. In one embodiment, the method includes receiving a first power waveform in a regulator module from a first power supply module and receiving a second power waveform in the regulator module from a second power supply module. The first and second power waveforms include high voltage, high frequency, chopped power waveforms. The regulator module includes an interleaved power supply stage that receives the first and second power waveforms as pulse-width modulated power signals.

The method includes converting the first and second power waveforms by the interleaved power supply stage to a low voltage, regulated voltage on an output bus, receiving a voltage feedback signal from the output bus, and adjusting a duty cycle based on the feedback signal. The method includes transmitting a drive signal based on the duty cycle to each of the first and second power supply modules. The first and second power supply modules use the drive signals to generate the first and second power waveforms.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
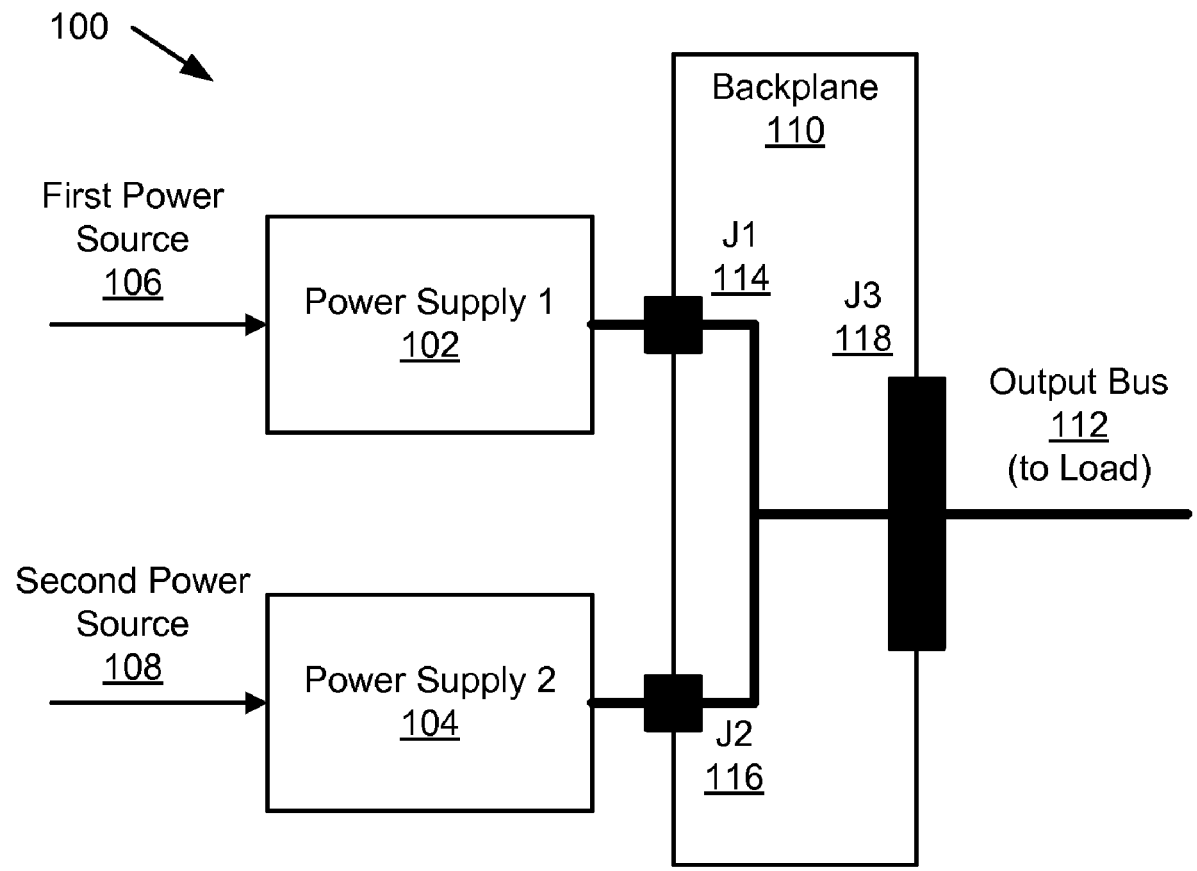
FIG. 1 is a schematic block diagram illustrating prior art redundant power supplies and a low-voltage, high-current backplane with connectors.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
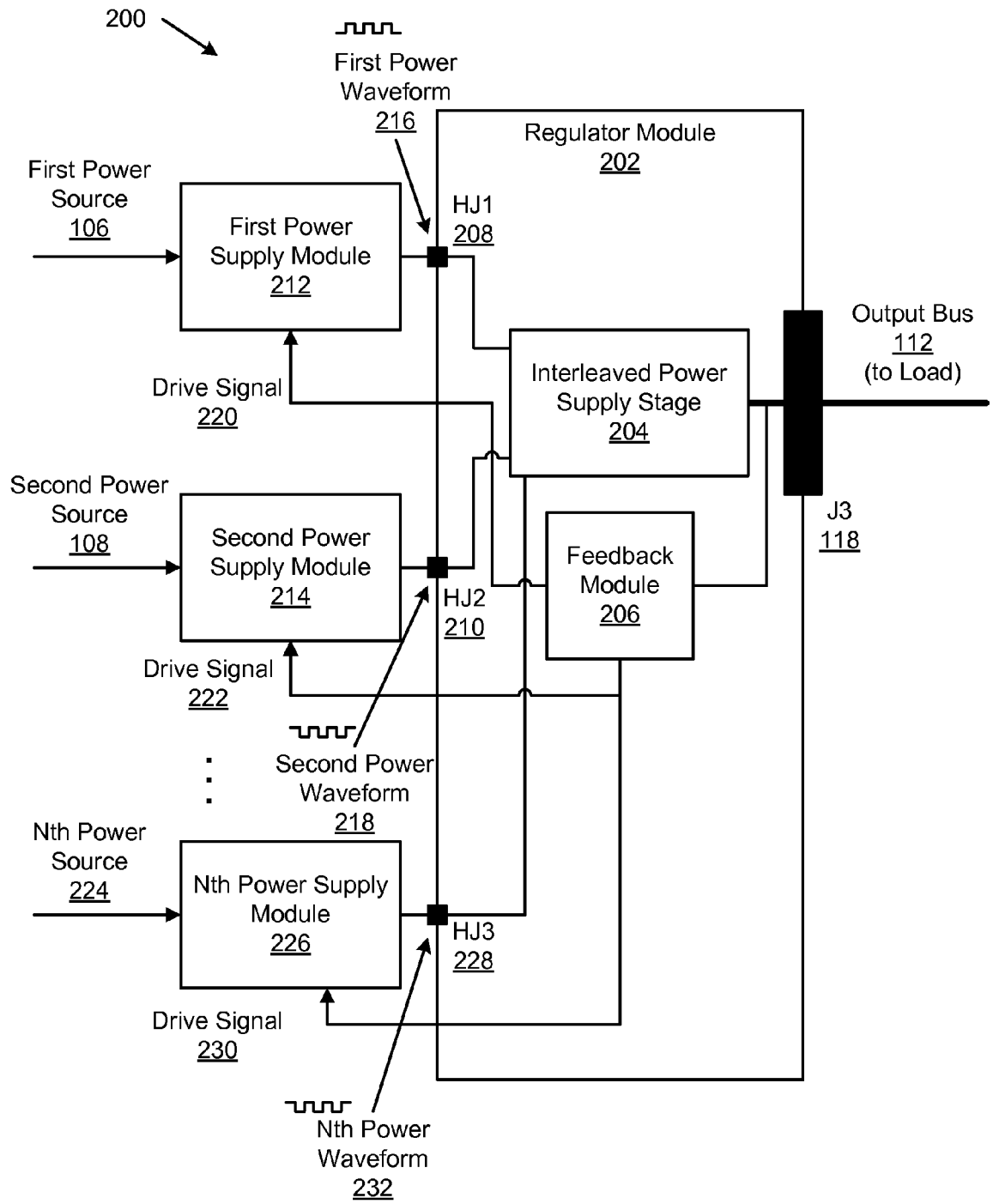
FIG. 2 is a schematic block diagram illustrating one embodiment of a system with an apparatus for low-cost, redundant power supplies in accordance with the present invention.

FIG. 2 is a schematic block diagram illustrating one embodiment of a system 200 with an apparatus 202 for low-cost, redundant power supplies in accordance with the present invention. The system 200 includes a regulator module 202 with an interleaved power supply stage 204, feedback module 206, and high voltage, high frequency connectors HJ1 208, HJ2 210 connected to a first power supply module 212 and a second power supply module 214 respectively, and a low voltage connector J3 118 connected to an output bus 112. The first power supply module 212 receives power from a first power source 106 and the second power supply module 214 receives power from a second power source 108, but both power supply modules 212, 214 may be connected to a single power source 106. The components of the system 200 are described below. In one embodiment, the system 200 may include additional 'n' number of components depicted as Nth Power Source 224, Nth Power Supply 226, connector HJ3 228, Drive Signal 230, and Nth Power Waveform 232. For example, one or more additional power sources, power supplies, connectors, drive signals, or waveforms may implemented in accordance with the present invention.

The system 200 includes a regulator module 202 that receives a first power waveform 216 from the first power supply module 212 and receives a second power waveform 218 from the second power supply module 214 and provides power to the low voltage, regulated output bus 112. The first and second power waveforms 216, 218 are high voltage, high frequency, chopped power waveforms.

Typical power supplies 102, 104 rated for a relatively high power level, such as 1200 watts ("W"), provide a low voltage, direct current ("DC"), high amperage as an output. In the present invention, the first and second power supply modules 212, 214 provide a high voltage, high frequency waveform 216, 218 as an output so that the connectors HJ1 208 and HJ2 210 between the first and second power supplies 212, 214 and regulator module 202 are smaller, less complex, and rated for a much lower amperage than traditional connectors 114, 116 to power supplies 102, 104. This is possible because power is a function of voltage and current. For a particular power level (such as 1200 W), as voltage increases, current decreases.

If the peak voltage of the first and second power waveforms 216, 218 is 400 volts ("V"), the peak amperage will be 3 amperes ("A"), which is much lower than the 100 A provided by typical 1200 W power supplies 102, 104 that provide 12 V as an output. Connectors 208, 210 rated at four amperes are much less complicated, are smaller, and cost much less than 100 A connectors 114, 116. Of course, one of skill in the art will recognize that other peak voltages can be provided by the first and second power supply modules 212, 214 so that the connectors HJ1 208 and HJ2 210 may be rated appropriately.

The first and second power waveforms 216, 218 are also high frequency and may be chopped waveforms. The regulator module 202 includes an interleaved power supply stage 204 that that receives the first and second power waveforms 216, 218 as pulse-width modulated power signals and converts the first and second power waveforms 216, 218 to the low voltage, regulated voltage on the output bus 112. The interleaved power supply stage 204 connects to both the first and second power supply modules 212, 214 through the high voltage, high frequency connectors HJ1 208, HJ2 210.

The interleaved power supply stage 204 includes at least a portion of a power supply stage capable of receiving two high voltage, high frequency waveforms 216, 218 and converting the waveforms 216, 218 to a regulated low voltage supplied to the output bus 112. For example, the integrated power supply stage 204 may include all or a portion of a buck converter, a buck-type converter, or other topology that will support receiving two high voltage, high frequency waveforms 216, 218 and convert the waveforms 216, 218 to a regulated low voltage. An example of an interleaved power supply stage 204 is depicted in the system 400 of FIG. 4. One of skill in the art will recognize topologies and components in an interleaved power supply stage 204 that can receive high voltage, high frequency waveforms 216, 218 from two power supply modules 212, 214 and convert the waveforms 216, 218 to a regulated low voltage.

The regulator module 202 includes a feedback module 206 that receives a voltage feedback signal from the output bus 112, adjusts a duty cycle based on the feedback signal, and transmits a drive signal 220, 222 based on the duty cycle to each of the first and second power supply modules 212, 214. The first and second power supply modules 212, 214 use the drive signals 220, 222 to generate the first and second power waveforms 216, 218. The feedback module 206 typically includes low voltage, low power components, such as a semiconductor regulator chip, resistors, capacitors, etc. that can be used to form a feedback loop sensing and regulating output voltage at the output bus 112.

Typically, switching power supplies are pulse-width modulated power supplies and switches of the power supplies open and close at a fixed switching rate. Usually, a duty cycle is a ratio of time a switch is commanded closed divided by the switching rate. If a switching frequency of a power supply is 100 kilo Hertz ("kHz"), the switching rate will be 10 microseconds, if a switch is commanded closed for 5 microseconds the duty cycle is 50%. Typically the duty cycle of a switching power supply is varied to regulate a voltage or current.

The feedback module 206 may include other drive circuitry and drive transformers to condition the duty cycle signal to be drive signals 220, 222 sufficient to turn on and off the switches of the first and second power supply modules 212, 214. In one embodiment, the feedback module 206 includes feedback loop components that are discrete components. In other embodiments, the feedback module 206 may include a processor or chip used in forming a feedback loop. One of skill in the art will recognize other components and implementations of a feedback module 206 that receives a feedback signal from the output bus 112, generates a duty cycle, and transmits drive signals 220, 222 based on the duty cycle to the first and second power supply modules 212, 214.

The drive signals 220, 220 from the feedback module 206 typically also include connectors (not shown) between the regulator module 202 and the first and second power supply modules 212, 214. The connectors typically serve to allow quick connection and disconnection of the first and second power supply modules 212, 214. The drive connections and the power connections HJ1 208, HJ2 210 typically allow the power supply modules 212, 214 to be hot-swappable, but may also include bolted connections, soldered connections, or any other connection between the first and second power supply modules 212, 214 and the regulator module 202.

Typically, the first and second power supply modules 212, 214 use the drive signals 220, 222 to drive switches in the first and second power supply modules 212, 214. Typically switches in the first and second power supply modules 212, 214 could be viewed together with components of the interleaved power supply stage 204 as a particular power supply topology. The switches of the first and second power supply modules 212, 214 connect and disconnect a high voltage source in the first and second power supply modules 212, 214 to the interleaved power supply 204.

By placing the switches of a power supply in the first and second power supply modules 212, 214 and other components in the interleaved power supply stage 204, reliability of the system 200 is increased. Typically, switches of a power supply, which are often semiconductor switches such as metal oxide field effect transistors ("MOSFETS"), are more likely to fail than other components of a power supply. By placing the switches in the first and second power supply modules 212, 214, if a switch fails, the power supply module with the failed switch (e.g. 212) can be replaced. Other components, such as capacitors, inductors, transformers, diodes, etc. in the interleaved power supply stage 204 and a regulator chip, logic devices, drive circuitry, transformers, etc. in the feedback module 206, are less likely to fail so placing the components in the regulator module 202 may not significantly affect reliability of the system 200.

Typically, the first and second power supply modules 212, 214 are designed to be hot-swappable, meaning that a failed power supply module (e.g. 212) can be removed and replaced while the regulator module 202 and the working power supply module 214 continue to operate. This feature allows increased reliability and data availability and may be important in a redundant power system 200.

In one embodiment, the feedback module 206 sends drive signals 220, 222 to the first and second power supply modules 212, 214 such that the first and second power waveforms 216, 218 are out of phase. Typically, the first power waveform 216 is 180 degrees out of phase from the second power waveform 218. This is advantageous because it may reduce ripple within the interleaved power supply stage 204 so filtering components in the integrated power supply stage 204 may be smaller.

While two power supply modules 212, 214 are depicted in the system 200 of FIG. 2, more power supply modules may be included. For example a third and/or a fourth power supply module may be included and connected to the regulator module 202. The additional power supply modules may be connected to the first and second power sources 106, 108 or to other sources. The additional power supply modules may provide power along with the first and second power supply modules 212, 214 or may be standby modules that function when another power supply module 212, 214 fails. One of skill in the art will recognize other configurations of power supply modules in addition to the first and second power supply modules 212, 214 consistent with the present invention.

Figure 3:
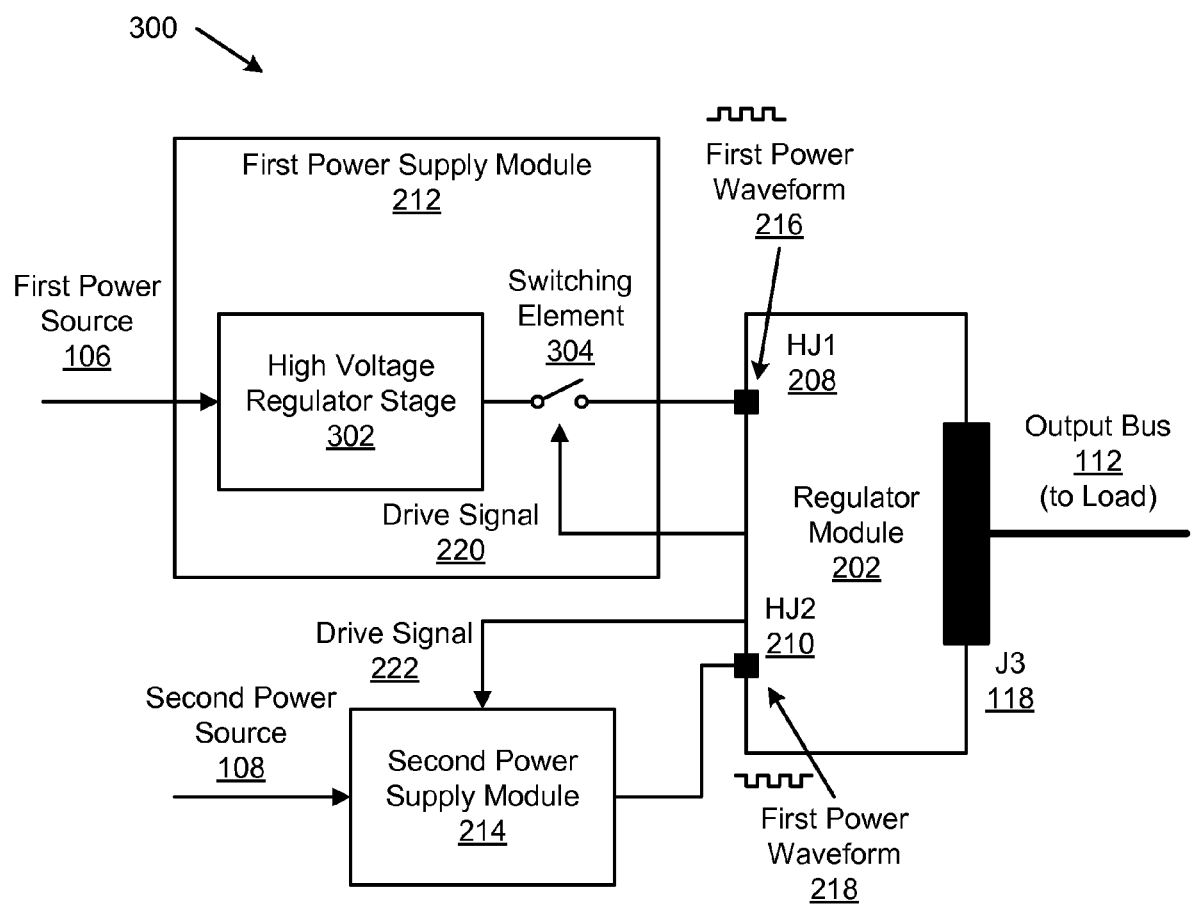
FIG. 3 is a schematic block diagram illustrating an alternate embodiment of a system with an apparatus for low-cost, redundant power supplies in accordance with the present invention.

FIG. 3 is a schematic block diagram illustrating an alternate embodiment of a system 300 with an apparatus for low-cost, redundant power supplies in accordance with the present invention. The system 300 includes a regulator module 202, output bus 112, a low voltage connector J3 118, a first power supply module 212, a second power supply module 214, high voltage, high frequency connectors HJ1 208, HJ2 210, a first and a second power source 106, 108, and first and second power waveforms 216, 218, which are substantially similar to those described above in relation to the system 200 of FIG. 2.

Again, the regulator module 202 powers the output bus 112 through low voltage connector J3 118 and is connected to the first power supply module 212 and to the second power supply module 214 through high voltage, high frequency connectors HJ1 208, HJ2 210. The first and second power supply modules 212, 214 are connected to the first and second power sources 106, 108 and supply first and second power waveforms 216, 218.

The first power supply module 212 includes a high voltage regulator stage 302 that receives input power from the first power source 106 and generates a high voltage on an internal bus. The internal bus may be the high voltage source mentioned above in relation to the system 200 of FIG. 2. The high voltage regulator stage 302 may receive an alternating current ("AC") voltage from the first power source 106 or may receive a DC voltage. Where the first power source 106 is an AC source, the high voltage regulator stage 302 typically includes a rectifier stage. The rectifier stage may be half-bridge rectifier, a full-bridge rectifier, or other type of rectifier.

The high voltage regulator stage 302 may also include filtering such as an electromagnetic compatibility ("EMC") filter. The rectifier and/or filter stages may provide power directly to the internal bus or the high voltage regulator stage 302 may include a power supply stage such as an active power factor correction stage. The active power factor correction stage, in one embodiment, is a boost converter and provides power factor correction so that the first power supply module 212 has a power factor, from the perspective of the first power source 106, as substantially unity power factor. In a preferred embodiment, when an active power factor correction stage or other power supply stage is included in the high voltage regulator stage 302, the high voltage regulator stage 302 will include a pulse-width modulator that regulates the intermediate bus. In another embodiment, the pulse-width modulator is included in the regulator stage 202 and controls switches in the power factor correction stage to regulate the intermediate bus.

The high voltage regulator module 302 regulates the intermediate bus to a high voltage. The high voltage, in one embodiment, is a voltage higher than a peak voltage of the first power source 106. Typically, the internal bus is regulated to a voltage between about 200 volts and 600 volts. The voltage of the internal bus is typically chosen based on a peak voltage of the first power source 106. For example, if the first power source 106 provides a root-mean-square ("RMS") voltage of 120 V, the peak voltage will be about 170 V and the internal bus voltage is typically higher than 170 V. If the first power source 106 is 208 V RMS, the peak voltage will be about 294 V. If the first power source 106 is 277 V RMS, the peak voltage will be about 391 V. If a topology other than a boost-derived topology is used in the high voltage regulator stage 302, the intermediate bus voltage may be lower than the peak input voltage. However, as the internal bus voltage is decreased, the amperage of the high voltage, high frequency connectors HJ1 208 and HJ2 210 will increase, which typically increases the cost of the connectors 208, 210.

The first power supply module 212 includes one or more switching elements 304 that connect and disconnect the internal bus to the regulator module 202 to generate the first power waveform 216. Each switching element 304 receives a drive signal 220 from the regulator module 220 and closes and opens the switching element 304 to adjust a duty cycle of the first power waveform 216 consistent with a duty cycle generated by the regulator module 202. The first power supply module 212 includes one or more switching element 304 based on a power supply topology formed by the regulator module 202 and first power supply module 212.

The switching elements 304 may be solid-state switches, such as MOSFETs, may be physical switches, or some other type of switching element 304 capable of connecting and disconnecting the internal bus to the regulator module 202. The switching elements 304 may all close and open together or may close and open in another sequence depending upon power supply topology. In one embodiment, the switching elements 304 use zero-voltage-switching techniques to reduce switching losses. In another embodiment, the switching elements 304 include snubbers and other circuitry to reduce stress on the switching element 304 or to reduce switching losses or noise. One of skill in the art will recognize other types, quantities, and configurations of switching elements 304 and other ways that the drive signal(s) 220 from the regulator module 202 can control the switching elements 304.

The first power supply module 212 works in combination with the regulator module 202 and the second power supply module 214 to provide a redundant power supply system 300 where the first and second power supply modules 212, 214 connect to the regulator module 202 through high voltage, high frequency, low current connectors HJ1 208, HJ2 210. The system 300 significantly reduces cost over a traditional system 100 with low voltage, high current connectors J1 114, J2 116. In the system 300 depicted in FIG. 3, the second power supply module 214, in one embodiment, is identical to the first power supply module 212.

Figure 4:
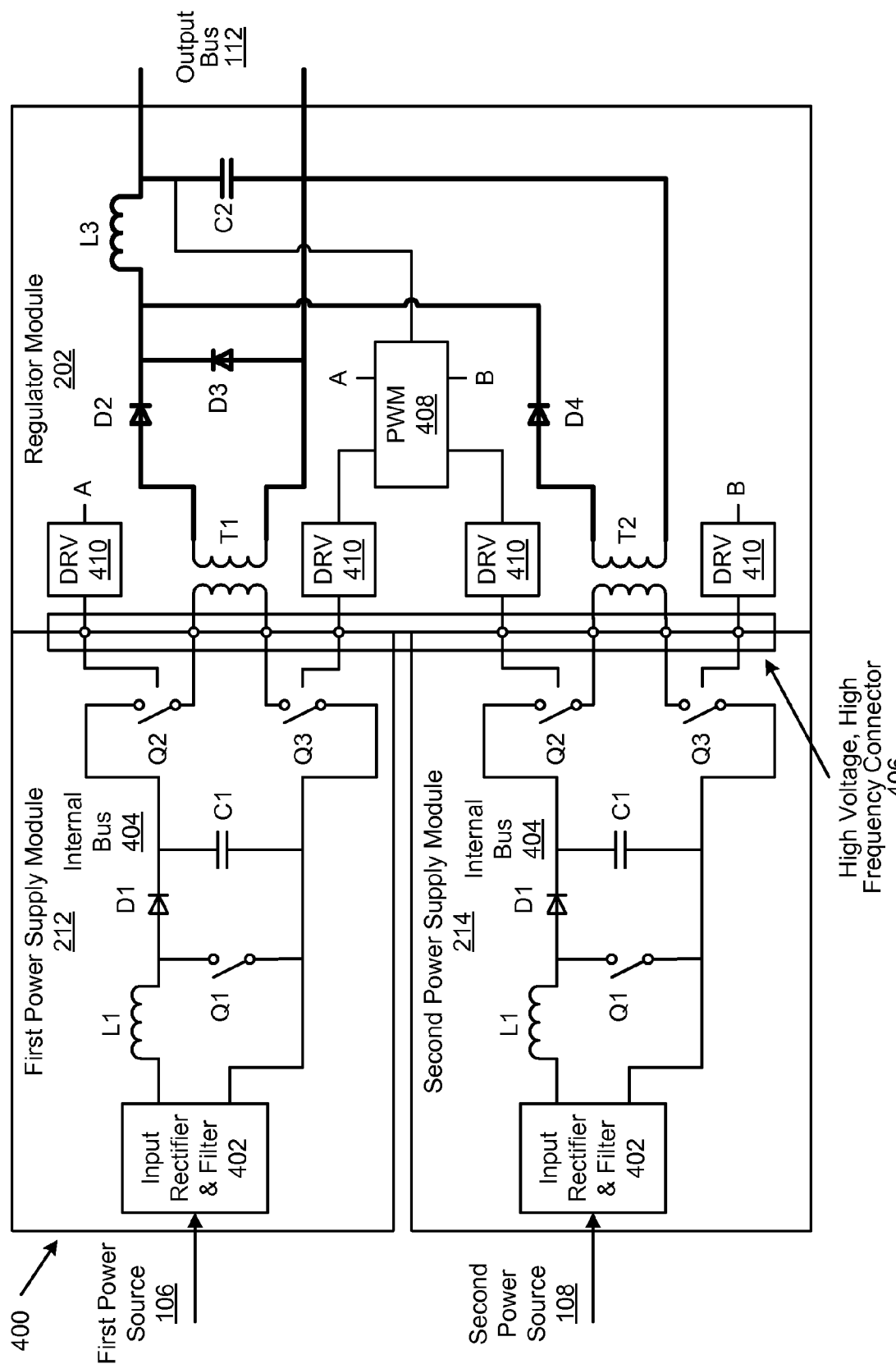
FIG. 4 is a schematic block diagram illustrating an example of a system with an apparatus for low-cost, redundant power supplies in accordance with the present invention.

FIG. 4 is a schematic block diagram illustrating an example of a system 400 with an apparatus for low-cost, redundant power supplies in accordance with the present invention. The system 400 includes a regulator module 202, a first power supply module 212, a second power supply module 214, a first power source 106, a second power source 108, and an output bus 112, which are substantially similar to those described above in relation to the systems 200, 300 of FIGS. 2 and 3. The system 400 is a specific embodiment illustrating one possible way to implement the present invention. One of skill in the art will recognize other embodiments of a high voltage, high frequency redundant bus power system in accordance with the invention disclosed herein.

The first power supply module 212 and the second power supply module 214 include an input rectifier and filter stage 402. The input rectifier and filter stage 402, in one embodiment, includes a full-bridge rectifier, a half-bridge rectifier, or other circuit to rectify AC voltage. The input rectifier and filter stage 402, in another embodiment, includes a filter such as an EMC filter. The first and second power supply modules 212, 214 include a boost converter that regulating an internal bus 404. The boost converter includes inductor L1, switch Q1, diode D1, and capacitor C1. Capacitor C1 is at the internal bus 404. A pulse-width modulator (not shown) regulates the internal bus 404. In one embodiment, the boost converter is an active power factor correction stage and uses voltage at the internal bus 404 as well as input voltage information to substantially provide a unity power factor correction load to the first and second power sources 106, 108. Operation and control of the boost converter is known to those of skill in the art.

The first and second power supply modules 212, 214 each include two switches Q2 and Q3 that connect and disconnect the internal bus 404 to the regulator module 202 through a high voltage, high frequency connector 406. The switches Q2 and Q3 are switched at a switching frequency of a power supply formed by the switches Q2 and Q3 and the components in the regulator module 202. As the switches are opened and closed, a high voltage, high frequency power waveform 216, 218 is transmitted through the connector 406 to the regulator module 202. The switches Q2, Q3 are controlled by a feedback module 206 in the regulator module 202.

The feedback module 206 depicted in the system 200 of FIG. 2 typically includes a pulse-width modulator 408, connection to the output bus 112, and drive circuits 410 depicted in the system 400 of FIG. 4. The pulse-width modulator 408 senses voltage at the output bus 112 and varies a duty cycle to control the switches Q2, Q3 of the power supply modules 212, 214. The pulse-width modulator 408 typically includes capacitors, resistors, comparators, operational amplifiers ("opamps"), etc. to form a feedback loop. The pulse-width modulator 408 may be implemented by discrete components or an integrated circuit. In one embodiment the pulse-width modulator 408 is a processor that acts to implement a feedback loop.

The system 400 includes drive circuits 410 to condition signals from the pulse-width modulator 408 to drive the switches Q2, Q3. Typically, the pulse-width modulator 408 would limit the duty cycle below 50% and would offset drive signals 220 to the first power supply module 212 from drive signals 222 to the second power supply module 214 by 180 degrees so that current swing in inductor L3 and ripple on capacitor C1 are minimized. Typically, the drive circuits 410 include capacitors, resistors, amplifiers, etc. to condition the signals 220, 222 to drive the switches Q2, Q3. The drive circuits 410, in one embodiment, include isolation transformers to reference the drive signals 220, 222 to a ground reference in the power supply modules 212, 214. One of skill in the art will recognize other ways to implement drive circuits 410 and a pulse-width modulator 408 to sense voltage on the output bus 112 to generate a duty cycle to control the switches Q2, Q3 in the first and second power supply modules 212, 214.

The regulator module 202 includes step-down transformers T1, T2 connected to the first and second power supply modules 212, 214 and to diodes D2 and D4. The diodes D2 and D4 connect to an inductor L3, which is connected to the output bus 112. A capacitor C2 is connected to the output bus 112 and a free-wheeling diode D3 is connected to the inductor L3 as shown.

In one mode of operation, when the switches Q2, Q3 of the first power supply module 212 are closed, the internal bus 404 is connected to the primary side of transformer T1, which steps down the voltage of the internal bus 404. Current will flow through the secondary side of the transformer T1, through diode D2, and will cause current to rise in inductor L3. When the switches Q2 and Q3 in the first power supply module 212 are switched off, voltage across the inductor L3 reverses and current continues to flow through the freewheeling diode D3.

The switches Q2 and Q3 of the second power supply module 214 are closed and voltage of the internal bus 404 is applied to the primary side of the step-down transformer T2. Current will flow through the secondary of the transformer T2, through diode D4, and current will start to rise in inductor L3. When the switches Q2, Q3 are opened, current in inductor L3 will start to fall and will flow through the free-wheeling diode D3. The current flowing in inductor L3 flows into capacitor C2 and charges the capacitor C2. Voltage across the capacitor C2 is adjusted by varying the duty cycle which lengthens or lessens an amount of time that the switches Q2 and Q3 are closed during each switching period. Current flows from the capacitor C2 to the output bus 112 to a load.

The dark lines in FIG. 4 indicate low voltage, high current components and buses (or wires). Note that the connector 406 is positioned so that a low current, high voltage, high frequency signal is transferred across the connector 406. This enables the power portions of the connector 406 to be smaller and less expensive than the power connectors J1 114, J2 116 of a system 100 with power supplies 102, 104 delivering low voltage to the backplane 110. The connector 406 typically is an interface for plugging in the power supply modules 212, 214 that includes other connectors, such as connectors for the drive signals 220, 222, communication connectors, etc.

Figure 5:
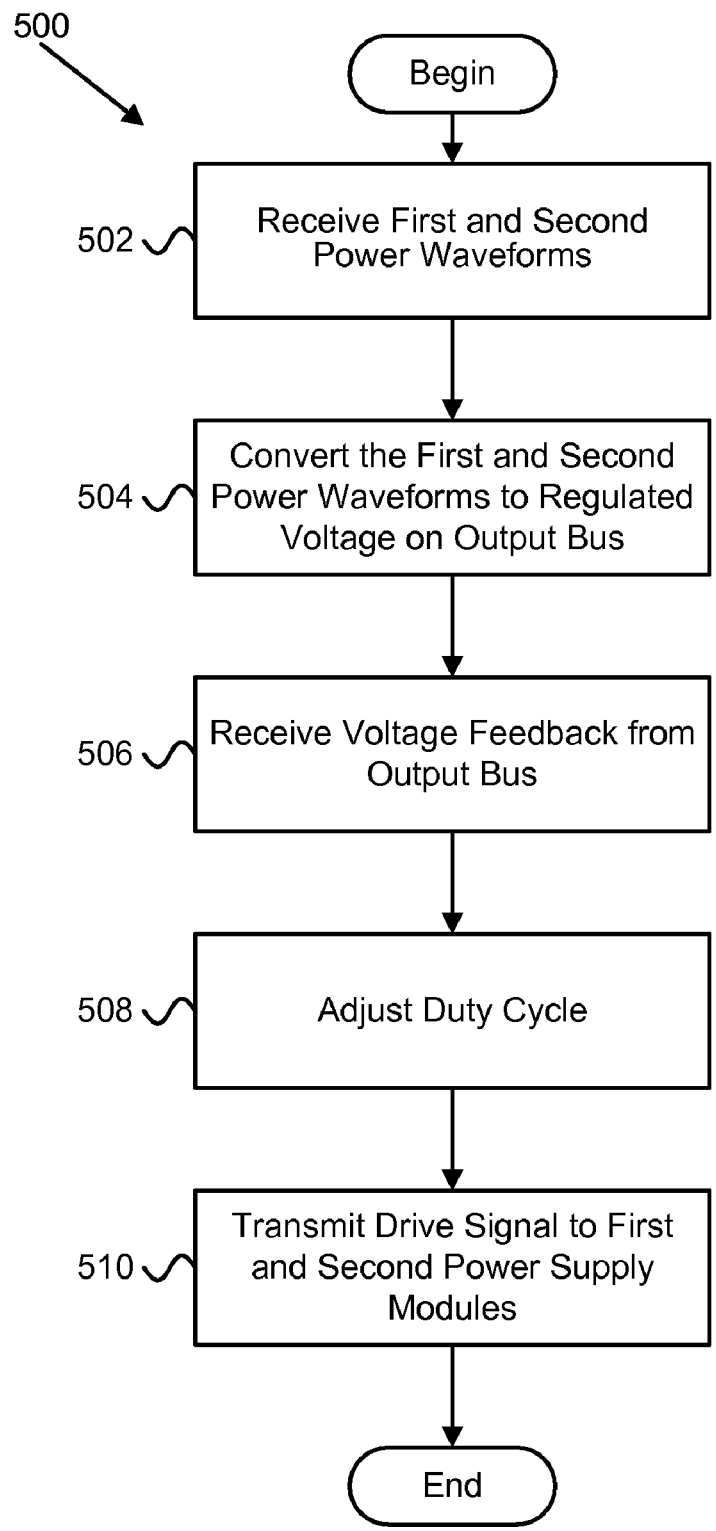
FIG. 5 is a schematic flow chart diagram illustrating one embodiment of a method for providing power using low-cost, redundant power supplies in accordance with the present invention.

FIG. 5 is a schematic flow chart diagram illustrating one embodiment of a method 500 for providing power using low-cost, redundant power supplies in accordance with the present invention. The method 500 begins and the regulator module 202 receives 502 first and second power waveforms 216, 218. The regulator module 202 converts 504 the first and second power waveforms 216, 218 to a regulated voltage on the output bus 112. The feedback module 206 in the regulator module 202 receives 506 a feedback signal, in the form of a voltage from the output bus 112 and adjusts 508 a duty cycle. The feedback module 206 transmits 510 drive signals derived from the duty cycle to switching elements 304 to the first and second power supply modules 212, 214 to generate the first and second power waveforms 216, 218 and the method 500 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for redundant power supplies, the apparatus comprising:
   a first high voltage connector and a second high voltage connector;
   a regulator module that receives a first power waveform from a first power supply module through the first high voltage connector and receives a second power waveform from a second power supply module through the second high voltage connector and provides power to a low voltage, regulated output bus, the first and second power waveforms comprising high voltage, high frequency, chopped power waveforms, the high voltage, high frequency, chopped waveforms comprising a pulse width modulated power signal generated by switching a power source external to the regulator module, the regulator module comprising
      an interleaved power supply stage that receives the first and second power waveforms as pulse-width modulated power signals and converts the first and second power waveforms to the low voltage, regulated voltage on the output bus; and
      a feedback module that receives a voltage feedback signal from the output bus, adjusts a duty cycle based on the feedback signal, and transmits a drive signal based on the duty cycle to each of the first and second power supply modules, the first and second power supply modules using the drive signals to generate the first and second power waveforms.

2. The apparatus of claim 1, wherein the first power supply module can be connected and disconnected the first high voltage connector while the regulator module is operational and wherein the second power supply module can be connected and disconnected at the second high voltage connector while the regulator module is operational.

3. The apparatus of claim 1, wherein the first and second power supply modules each comprise one or more switching elements that connect and disconnect a high voltage source to the regulator module, wherein each switching element receives a drive signal from the feedback module and closes and opens the switching element to adjust a duty cycle of the first and second power waveforms consistent with the duty cycle generated by the feedback module.

4. The apparatus of claim 3, wherein the first power supply module receives power from a first power source and the second power supply module receives power from a second power source.

5. The apparatus of claim 3, wherein the first and second power supply modules each comprise at least one of a rectifier stage to rectify alternating current ("AC") power, an electromagnetic compatibility ("EMC") filter, and an active power factor correction stage.

6. The apparatus of claim 3, wherein the high voltage source of the first power supply module comprises an internal bus regulated by the first power supply module and the high voltage source of the second power supply module comprises an internal bus regulated by the second power supply module.

7. The apparatus of claim 3, wherein the high voltage source of each of the first and second power supply modules is regulated to voltage within a voltage range of about 200 volts to 600 volts and wherein the output bus is regulated to a voltage in an output voltage range of about three volts to about 24 volts and the low voltage, high current connector is rated to a current in a current range of about 50 amperes to about 400 amperes.

8. The apparatus of claim 1, further comprising a low voltage, high current connector that connects the regulated output bus to a load.

9. The apparatus of claim 1, wherein the interleaved power supply comprises one or more step-down transformers, one or more power diodes, one or more inductors, and at least one capacitor, the transformers, diodes, inductors, and capacitors arranged in a power supply topology to receive the first and second power supply waveforms and to provide the regulated voltage to the output bus.

10. The apparatus of claim 1, further comprising two or more drive transformers, each drive transformer receiving a drive signal from the feedback module and conditioning the drive signal to an appropriate level to connect to one or more switching elements in the first and second power supply modules.

11. The apparatus of claim 1, wherein one or more drive signals to the first power supply module are arranged with respect to one or more drive signals to the second power supply module such that the first power waveform is out of phase with the second power waveform.

12. An apparatus for redundant power supplies, the apparatus comprising:
    a first high voltage connector and a second high voltage connector;
    a first power supply module that receives power from a first power source and that receives one or more first drive signals from a regulator module and provides a first power waveform to the regulator module through the first high voltage connector, the first power waveform comprising a high voltage, high frequency, chopped power waveform, the high voltage, high frequency, chopped waveforms comprising a pulse width modulated power signal generated by switching a power source external to the regulator module, the first power supply module comprising
       a high voltage regulator stage that receives input power from the first power source and generates a high voltage on an internal bus; and
       one or more switching elements that connect and disconnect the internal bus to the regulator module to generate the first power waveform, wherein each switching element receives a drive signal from the regulator module and closes and opens the switching element to adjust a duty cycle of the first power waveform consistent with a duty cycle generated by the regulator module;
    wherein the regulator module receives the first power waveform from the first power supply module and a second power waveform from a second power supply module through the second high voltage connector and provides power to a low voltage, regulated output bus, the power provided to the low voltage bus being converted from the first and second power waveforms, and wherein the regulator module transmits the one or more first drive signals to the first power supply module and one or more second drive signals to the second power supply module, the first and second drive signals related to a duty cycle generated to regulate the output bus.

13. An apparatus for redundant power supplies, the apparatus comprising:
a first transformer comprising a step-down transformer, wherein a primary winding of the first transformer comprises a connection to a first power supply module through a connector, wherein the first power supply module supplies a high voltage, high frequency, chopped power waveform to the first transformer;
a second transformer comprising a step-down transformer, wherein a primary winding of the second transformer comprises a connection to a second power supply module through a connector, wherein the second power supply module supplies a high voltage, high frequency, chopped power waveform to the second transformer;
a first diode, wherein a positive terminal of a secondary winding of the first transformer comprises a connection to an anode side of the first diode;
a second diode, wherein a positive terminal of a secondary winding of the second transformer comprises a connection to an anode side of the first diode;
an inductor with a first connection connected to a cathode side of the first diode and to a cathode side of the second diode; and
an output bus, wherein a positive terminal of the output bus comprises a connection to a second connection of the inductor and a negative terminal of the output bus comprises a connection to a negative terminal of the secondary winding of the first transformer and to a negative terminal of the secondary winding of the second transformer, the output bus providing a regulated direct current ("DC") voltage to a load.

14. The apparatus of claim 13, further comprising a capacitor connected between the positive and negative terminals of the output bus.

15. The apparatus of claim 13, further comprising a free-wheeling diode, wherein an anode of the free-wheeling diode comprises a connection to the negative terminal of the output bus and a cathode of the free-wheeling diode comprises a connection to the first connection of the inductor.

16. A system for redundant power supplies, the system comprising:
a first power supply module that receives power from a first power source;
a second power supply module that receives power from a second power source;
a first high voltage connector and a second high voltage connector;
a regulator module that receives at least a first power waveform from the first power supply module through the first high voltage connector and that receives a second power waveform from the second power supply module through the second high voltage connector and provides power to a low voltage, regulated output bus, the first and second power waveforms comprising high voltage, high frequency, chopped power waveforms, the high voltage, high frequency, chopped waveforms comprising a pulse width modulated power signal generated by switching a power source external to the regulator module, the regulator module comprising
an interleaved power supply stage that receives the first and second power waveforms as pulse-width modulated power signals and converts the first and second power waveforms to the low voltage, regulated voltage on the output bus; and
a feedback module that receives a voltage feedback signal from the output bus, adjusts a duty cycle based on the feedback signal, and transmits a drive signal based on the duty cycle to each of the first and second power supply modules, the first and second power supply modules using the drive signals to generate the first and second power waveforms.

17. The system of claim 16, further comprising one or more power supply modules in addition to the first and second power supply modules, the additional power supplies each providing high voltage, high frequency, chopped waveform to the regulator stage, each additional power supply connected to one of the first power source, the second power source, and an additional power source.

18. The system of claim 16, wherein the first power supply module, the second power supply module, and the regulator module comprise elements in a blade center and the output bus comprises a bus in the blade center that provides power to blades of the blade center, wherein the first and second power supply modules provide redundant power to the blade center and are connected to the regulator module through one or more high voltage, high frequency connectors.

19. A computer program product comprising a computer readable medium having computer usable program code executable to perform operations for regulating power with redundant power supplies, the operations of the computer program product comprising:
receiving a first power waveform in a regulator module from a first power supply module through a first high voltage connector and receiving a second power waveform in the regulator module from a second power supply module through a second high voltage connector, the first and second power waveforms comprising high voltage, high frequency, chopped power waveforms, the high voltage, high frequency, chopped waveforms comprising a pulse width modulated power signal generated by switching a power source external to the regulator module, the regulator module comprising an interleaved power supply stage that receives the first and second power waveforms as pulse-width modulated power signals;
converting the first and second power waveforms by the interleaved power supply stage to a low voltage, regulated voltage on an output bus;
receiving a voltage feedback signal from the output bus;
adjusting a duty cycle based on the feedback signal; and
transmitting a drive signal based on the duty cycle to each of the first and second power supply modules, the first and second power supply modules using the drive signals to generate the first and second power waveforms.

* * * * *